May 16, 1961  C. T. OLSON ET AL  2,984,071
SAFETY DEVICE FOR HYDRAULIC BRAKES
Filed May 11, 1959  2 Sheets-Sheet 1

Carl T. Olson
Sam Gelotti
Charles F. Eckert
INVENTORS

May 16, 1961  C. T. OLSON ET AL  2,984,071
SAFETY DEVICE FOR HYDRAULIC BRAKES
Filed May 11, 1959  2 Sheets-Sheet 2

Carl T. Olson
Sam Gelotti
Charles F. Eckert
INVENTORS

United States Patent Office 2,984,071
Patented May 16, 1961

2,984,071
SAFETY DEVICE FOR HYDRAULIC BRAKES
Carl T. Olson, R.D. 1, Box 44; Sam Gelotti, 703 Graham; and Charles F. Eckert, R.D. 3, all of Belle Vernon, Pa.
Filed May 11, 1959, Ser. No. 812,284
7 Claims. (Cl. 60—54.5)

This invention relates in general to new and useful improvements in hydraulic brake systems, and more specifically to an improved safety device for use in conjunction with hydraulic brakes.

The hydraulic brake system of each automobile includes four wheel cylinders, there being one wheel cylinder for each wheel of the vehicle, and a master cylinder which is in the form of a pump. When the brakes are applied, the master cylinder is actuated to pump hydraulic fluid into the individual wheel cylinders so as to actuate the wheel brakes. Should any one of the brake lines connecting the wheel cylinders to the master cylinder rupture or should any one of the individual wheel cylinders be defective, when the master cylinder is actuated, the hydraulic fluid pumped thereby will be pumped out through the rupture with the result that the brakes of the vehicle will either be improperly applied or not applied at all. This is a common brake failure and has resulted in many accidents.

It is therefore the primary object of this invention to provide a safety device which may be incorporated in a hydraulic brake system intermediate the master cylinder and the brake lines for the individual wheel cylinders, the safety device having at least two sections, one section being for the front wheel cylinders and the other section being for the rear wheel cylinders, and each section operating independently whereby should, for example, one of the front wheel cylinder lines rupture, no hydraulic fluid would be pumped to the front wheel cylinders, but the rear wheel cylinders would be actuated in a novel manner so that sufficient braking may be maintained on the vehicles for emergency purposes.

Another object of the invention is to provide a safety device for hydraulic braking systems, the safety device being mounted in the hydraulic braking system intermediate the master cylinder and brake lines for individual wheel cylinders, the safety device including a housing having formed therein a pair of housing cylinders and a reservoir, the reservoir being normally communicated with the housing cylinders and supplying hydraulic fluid to the individual wheel brake lines, and there being a piston in each one of the housing cylinders for pumping hydraulic fluid into the individual brake lines, the pistons being actuated by hydraulic fluid pumped into the opposite ends of the housing cylinders upon the actuation of the master cylinder.

Another object of this invention is to provide a hydraulic brake system wherein the individual wheel cylinders are not hydraulically connected to the master cylinder, there being disposed intermediate the master cylinder and the individual wheel cylinders a piston which is shifted upon the actuation of the master cylinder to pump fluid from a separate reservoir into the individual wheel cylinders, the piston having a large diameter input end and a smaller diameter output end whereby there is a multiplication of forces so that the device not only functions as a safety device, but also induces a power braking effect.

A further object of this invention is to provide a safety device for hydraulic brakes, the safety device including a reservoir the hydraulic fluid which is directed into the individual wheel brake lines, and there being at least a pair of pistons disposed in the hydraulic lines intermediate the master cylinder and the brake cylinders, the pistons being shiftable upon the actuation of the master cylinder to pump fluid from the reservoir into the individual wheel cylinders, each piston being associated with a pair of wheel cylinders which are disposed either at the front or rear of a vehicle, and there being provided a valve assembly which is closed in the event there should be a failure in either one of the wheel cylinders or one of the wheel cylinder brake lines so that one-half only of the brake system will function, thereby eliminating the complete failure of the hydraulic brakes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
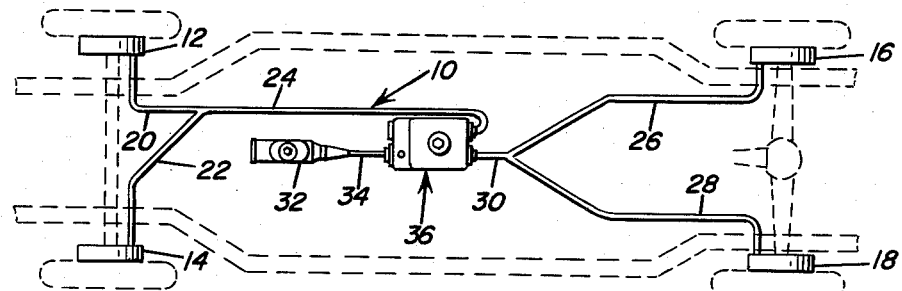
Figure 1 is a schematic view of a vehicle hydraulic brake system and shows mounted therein the safety device which is the subject of this invention.

Referring now to the drawings in detail, attention is first directed to Figure 1, wherein there are illustrated the details of the conventional type of vehicle hydraulic brake system with which the present invention cooperates, the hydraulic brake system being referred to in general by the reference numeral 10. The hydraulic brake system 10 includes a pair of front wheel brakes 12 and 14 and a pair of rear wheel brakes 16 and 18. Individual brake lines 20 and 22 extend to the wheel brakes 12 and 14, respectively, with brake lines 20 and 22 merging into a brake line 24. Also, individual brake lines 26 and 28 are connected to the wheel brakes 16 and 18, respectively, with the brake lines 26 and 28 merging into a single brake line 30. The customary hydraulic brake system also includes a master cylinder 32 which is in the form of a pump. A brake line 34 is connected to the master cylinder 32. The brake line 34 is normally connected to the brake lines 24 and 30 for supplying brake fluid to the individual wheel cylinders. However, incorporated in the brake system 10 is the safety device which is the subject of this invention, the safety device being generally referred to by the reference numeral 36. The safety device 36 has coupled thereto the brake lines 24, 30 and 34.

Figure 2:
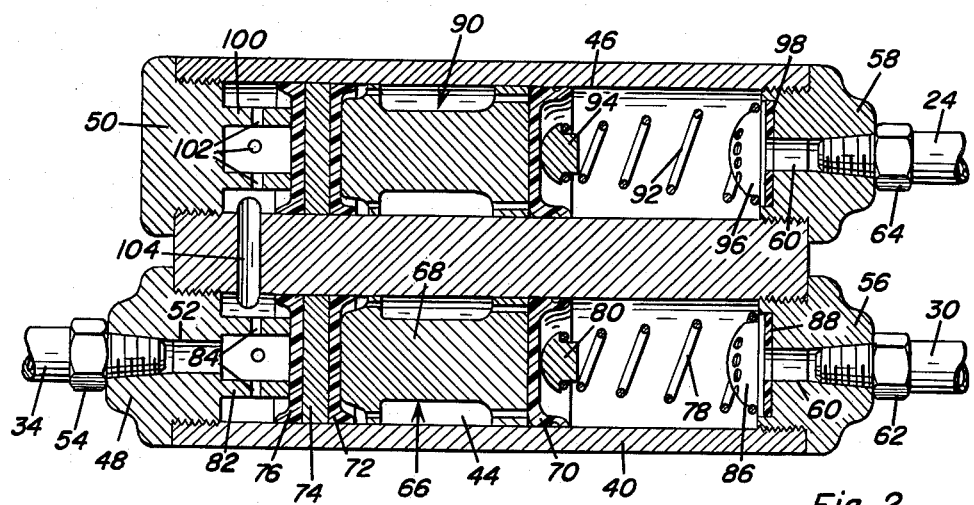
Figure 2 is an enlarged horizontal sectional view taken through the lower part of the safety device substantially upon the section line 2—2 of Figure 3 and shows the general arrangement of the cylinders and pistons of the safety device.
Figure 3:
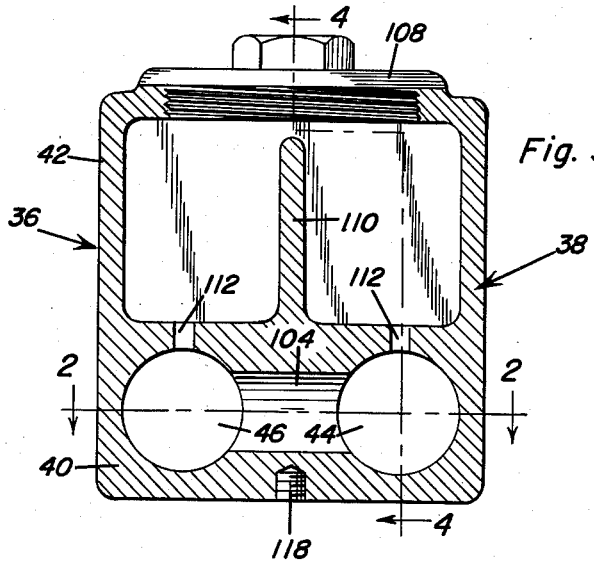
Figure 3 is an enlarged transverse vertical sectional view taken substantially upon the plane indicated by the section line 3—3 of Figure 4 and shows the general construction of the housing of the safety device, the various fittings of the safety device, including a piston, being omitted for purposes of clarity.
Figure 4:
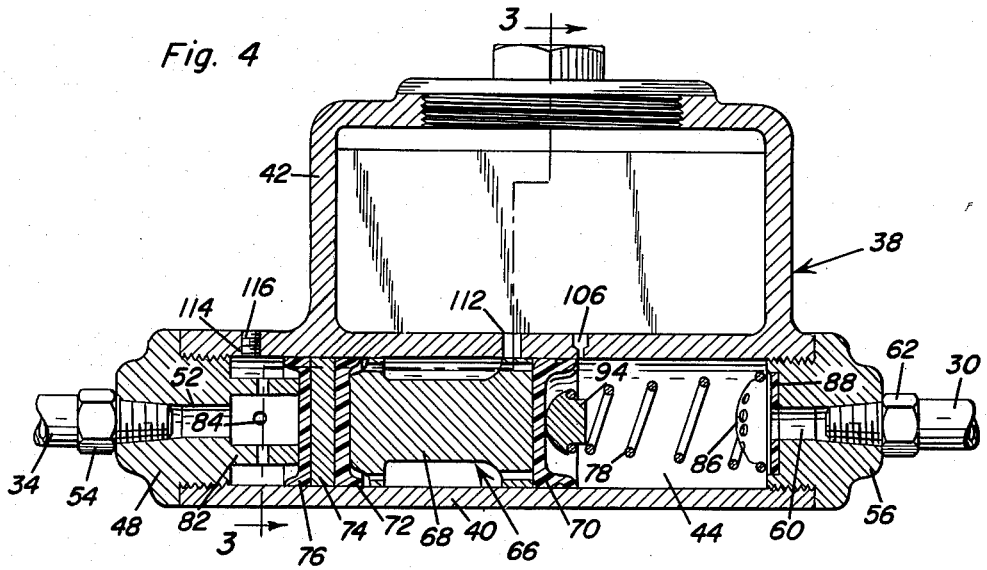
Figure 4 is an enlarged vertical sectional view taken substantially upon the plane indicated by the section line 4—4 of Figure 3 and shows further the details of the safety device.

Referring now to Figures 2, 3 and 4 in particular, it will be seen that the safety device 36 includes a housing which is generally referred to by the numeral 38. The housing 38 includes a flat, generally rectangular cross-sectional lower portion 40 which has extending upwardly therefrom a reservoir 42. It is to be noted that the lower portion 40 is of a greater length than the reservoir 42, although the lower portion 40 and reservoir 42 are of the same width, as is illustrated in Figure 3.

As is clearly shown in Figure 2, the lower portion 40 is provided with a pair of parallel cylinders 44 and 46 which are identical and which extend entirely through the lower portion 40. The first ends of the cylinders 44 and 46 are closed by fittings 48 and 50, respectively, which are threaded into place. The fitting 48 differs from the fitting 50 only in that it is provided with a bore 52 therethrough to which a fitting 54 for the brake line 34 is coupled. The second ends of the cylinders 44 and 46 are closed by identical fittings 56 and 58. The fittings 56 and 58 have bores 60 extending therethrough into which there are threadedly engaged fittings 62 and 64 for the brake lines 30 and 24, respectively.

Considering first the cylinder 44, it will be seen that a piston assembly, generally referred to by the numeral 66, is positioned therein. The piston assembly 66 includes a main piston body 68 which is provided at the right end thereof with a sealing cup 70. The sealing cup 70 faces toward the right. At the left end of the piston member 68 is a second sealing cup 72 which is telescoped over the end of the piston member 68 and also faces toward the right. Disposed immediately to the left of the sealing cup 72 is a piston extension 74 in the form of a spacer. A third sealing cup 76 is disposed to the left of the piston extension 74 and faces to the left.

A spring 78 is disposed intermediate the piston unit 66 and the fitting 56. The spring 78 is provided at the left end thereof with a fitting 80 which engages the sealing cup 70. Thus the piston unit 66 is constantly urged to the left or toward the first end of the cylinder 44 by the springs 78. Movement of the piston unit 66 to the left is limited by a cylindrical extension 82 on the fitting 48. The extension 82 is concentric with the bore 82 and is provided with a plurality of relief ports 84 through which hydraulic fluid may flow without restriction.

A check valve member 86 overlies the left end of the bore 60 of the fitting 62. A washer 88 is provided so as to form a seal between the check valve member 86 and the fitting 56.

A piston unit 90, which is identical with the piston unit 66, is disposed in the cylinder 46. The spring 92, which is identical to the spring 78 is positioned in the cylinder 46 and urges the piston unit 90 to the left. The spring 92 is provided with a fitting 94 which engages the piston unit 90 and the spring 92 also serves to hold in place a check valve 96, which is identical with the check valve 86. The check valve 96 is sealed with respect to the fitting 58 by means of a gasket 98.

The movement of the piston unit 90 to the left is limited by a cylindrical extension 100 on the fitting 50. Like the extension 82, the cylindrical extension 100 is provided with a plurality of ports 102 to permit unrestricted flow of hydraulic fluid.

Although the brake line 34 from the master cylinder 32 opens only into the cylinder 44, the piston unit 90 is actuated since the first ends of the cylinders 44 and 46 are communicated by a transverse port 104. Thus when the master cylinder 32 is actuated, hydraulic fluid will be pumped into the first or left ends of the cylinders 44 and 46 so as to urge the piston units 66 and 90 to the right. Reference is now had to Figure 4 in particular. It is to be noted that passages 106 extend from the reservoir 42 into each of the cylinders 44 and 46 to the right of its respective piston unit. In this manner the individual brake lines 24 and 30 are continuously communicated with the interior of the reservoir 42 and the hydraulic fluid stored therein when the brake system is not operating. When the piston units 66 and 90 are moved from left to right, the passages 106 will be immediately closed and the hydraulic fluid disposed in the right ends of the cylinders 44 and 46 will be pumped into the brake lines 30 and 24, respectively, to actuate the individual wheel brakes. Thus while there is no hydraulic communication between the master cylinder 32 and the individual wheel brakes, during the normal operation of the hydraulic brake system 10, the results will be the same as that before the safety device 36 was incorporated in the brake system. On the other hand, should a leak develop in one part of the hydraulic brake system, the piston unit 66 or 90 providing the hydraulic fluid to that particular part of the brake system will move all the way to the right and close its respective check valve 86 or 96.

The other of the piston units will continue to function in a normal manner so that the vehicle will still have either front wheel brakes or rear wheel brakes at all times even though the brake system has a rupture. Should there be a rupture of a part of the brake system, and the vehicle only had two wheel brakes, the operator of the vehicle will be immediately appraised of this since the braking power of the vehicle will be greatly reduced. The operator of the vehicle should then drive with caution to the nearest repair shop.

At this time it is pointed out that the reservoir 42 is provided with a filler cap 108 which may be removed to supply the reservoir with hydraulic fluid. Also, the longitudinal partition wall 110 extends throughout the length of the reservoir 42 dividing it into two halves. Further, a passage 112 opens from each of the cylinders 44 and 46 into the reservoir 42 intermediate the ends of its respective piston unit. The purpose of the passage 112 is to supply hydraulic fluid to the spacer sealing cups 72 behind the piston heads so as to provide pressure sealing for the piston units when actuated during brake applying movement, while during the return stroke of the piston units one-way sealing cups 70 permit escape of the fluid into the braking chamber 44 and 46.

Since there is no hydraulic connection between the wheel cylinders and the master cylinder 32, it is necessary that the brake system 10 be bled both at the wheel cylinders and intermediate the master cylinder 32 and the safety device 36. This is accomplished by providing the bleed opening 114 in the lower part 40 of the housing 38 in communication with the left end of the cylinder 44, as is shown in Figure 4. The bleed opening 114 is normally closed by a screw 116. Also, as is shown in Figure 3, the bottom wall of the housing 38 will be provided with at least one internally threaded bore 118 to facilitate the mounting of the safety device 36.

Figure 5:
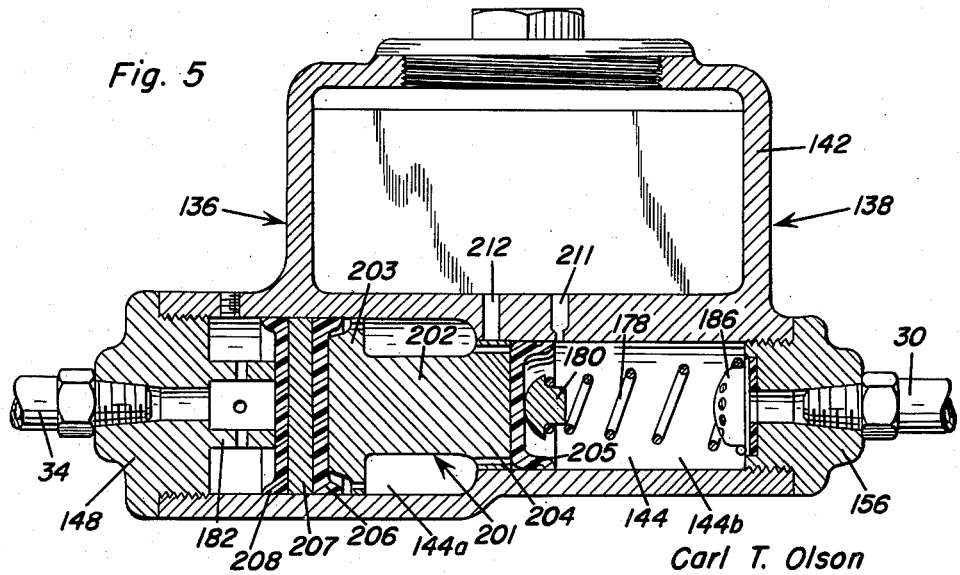
Figure 5 is an enlarged vertical sectional view similar to Figure 4 and shows the modified form of safety device.

Reference is now had to Figure 5 wherein there is illustrated a modified form of safety device which is generally referred to by the reference numeral 136. The safety device 136 includes a housing generally referred to by the reference numeral 138. The housing 138 is identical with the housing 38 with one exception which will be described in detail hereinafter.

The lower part of the housing 138 is provided with a pair of cylinders of which only one cylinder 144 has been illustrated. Cylinders correspond to the cylinders 44 and 46 of the safety device 36. However, the cylinder 144 is provided with a large diameter left portion 144a and a smaller diameter right portion 144b. The left end of the cylinder 144 is closed by a fitting 148 which corresponds to the fitting 48 and which has connected thereto the brake line 34. The right end of each of the cylinders is closed by a fitting 156 which corresponds to the fittings 56 and 58 and to which there will be coupled the brake lines 24 and 30. Also, the upper part of the housing 138 defines a reservoir 142 which corresponds to the reservoir 42.

A piston unit 201 is positioned within the cylinder 144. The piston unit 201 includes a piston member 202 which has an enlarged left end 203 and a smaller right end 204. The right end 204 is disposed within the cylinder portion 144b and is engaged with a sealing cup 205 which faces to the right. A second sealing cup 206, which is disposed in the piston portion 144a, also faces to the right and is partially telescoped over the enlarged end 203. A piston extension or spacer 207 is disposed immediately to the left of the sealing cup 206. In abutment with the piston extension 207 is a third sealing cup 208 which faces to the left.

The piston unit 201 is urged to the left by a return spring 178 which corresponds to the spring 78. The return spring 178 has a fitting 180 which engages the sealing cup 205. The return spring 178 also holds in place a check valve 86 which is identical with the check valve 86. Movement of the piston unit 201 to the left is limited by a cylindrical extension 182 of the fitting 148.

It is also pointed out that the reservoir 142 is communicated with each of the cylinders 144 by a passage 211, which corresponds to the passage 106, and a passage 212, which corresponds to the passage 112.

The operation of the safety device 136 will be identical with that of the safety device 36 with one exception. Since the left end of the piston 201 is of a much larger diameter than the right end thereof, it will be seen that there will be a multiplication of forces and a greater pressure will be exerted in the cylinder portion 144b than in the cylinder portion 144a. Thus the safety device 136 will also produce a power braking effect.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A safety device for hydraulic brake system including a master cylinder and brake wheel cylinders, comprising, a housing defining a reservoir and a pair of cylinder means, piston means slidably disposed within each cylinder means, axially projecting abutment means closing an inlet end of each cylinder means and defining an axial chamber having an annular abutment surface at an inner axial end thereof abutting against one end of each piston means to define brake release limit positions, inlet means connected to said master cylinder and to only one abutment means for unrestricted communication with inlet ends of both cylinder means through said axial chambers so that brake apply pressure may be initially applied against said one ends of the piston means on radially inner and outer sides of the annular abutment surfaces, outlet means connecting outlet ends of said pair of cylinder means to said brake wheel cylinders, restricted passage means between said reservoir and said outlet ends of the cylinders which are closed in response to movement of the piston means from their brake release limit positions, and spring means abutting between the other ends of the piston means and outlet ends of the cylinder means.

2. The device as defined in claim 1, wherein said inlet means comprises an inlet passage connected to the axial chamber of said one abutment means of one of the cylinder means for connecting said one cylinder means to the master cylinder, radial passages disposed on each abutment means in communication with the inlet end of the cylinder means and each axial chamber and a connecting passage disposed intermediate said one end of the cylinder means and the inner axial ends of the abutment means and connecting the inlet ends of said cylinder means.

3. The device as defined in claim 1, wherein each piston means comprises a main piston member having one sealing cup means attached to both ends thereof and a spacer piston element at the one end of the piston means mounting an oppositely directed one-way sealing cup means against which the annular abutting surface abuts.

4. The device as defined in claim 1, wherein said spring means includes an abutment element engaging a central portion of the sealing cup means at the other end of each piston means to thereby facilitate flexing of the aforementioned sealing cup means during a return stroke of said piston means to permit escape of fluid past said sealing cup means.

5. The safety device of claim 1 wherein each cylinder means includes a large diameter inlet end portion and a smaller diameter outlet end portion, each of said piston means having large and smaller portions disposed in respective portions of an associated cylinder means.

6. The device as defined in claim 5, wherein each piston means comprises a main piston member having one sealing cup means attached to both ends thereof and a spacer piston element at the one end of the piston means mounting an oppositely directed one-way sealing cup means against which the annular abutting surface abuts.

7. The device as defined in claim 6, wherein said spring means includes an abutment element engaging a central portion of the sealing cup means at the other end of each piston means to thereby facilitate flexing of the aforementioned sealing cup means during a return stroke of said piston means to permit escape of fluid past said sealing cup means.

References Cited in the file of this patent

UNITED STATES PATENTS

| | | |
|---|---|---|
| 1,978,669 | Carroll | Oct. 30, 1934 |
| 2,198,522 | Adam | Apr. 23, 1940 |
| 2,484,177 | Mapes et al. | Oct. 11, 1949 |
| 2,560,105 | Hart | July 10, 1951 |
| 2,581,792 | Goodell | Jan. 8, 1952 |
| 2,585,511 | Sparks et al. | Feb. 12, 1952 |
| 2,745,252 | Reese et al. | May 15, 1956 |

FOREIGN PATENTS

| | | |
|---|---|---|
| 668,612 | Germany | Dec. 7, 1958 |
| 422,214 | Great Britain | Jan. 8, 1935 |